United States Patent [19]

Willis

[11] 4,179,368

[45] Dec. 18, 1979

[54] G-FACTOR COMPENSATED HYDRAULIC FLOCCULATION SYSTEM

[76] Inventor: Roderick M. Willis, 2624 W. Crockett St., Seattle, Wash. 98199

[21] Appl. No.: 901,255

[22] Filed: Apr. 28, 1978

[51] Int. Cl.$^2$ .............................................. B01D 21/01
[52] U.S. Cl. .................................. 210/42 R; 210/136; 210/205
[58] Field of Search ............... 210/42 R, 46, 51–54 R, 210/59, 61, 118, 136, 209, 201, 206, 207, 205, 532 R; 137/12, 505.17, 527.6, 527.8, 533, 535, 572, 592; 209/5

[56] References Cited

U.S. PATENT DOCUMENTS

| | | | |
|---|---|---|---|
| 935,303 | 9/1909 | Greth | 210/200 X |
| 1,294,014 | 2/1919 | Worster | 137/533 |
| 1,829,666 | 10/1931 | Minster | 137/527.8 X |
| 3,037,754 | 6/1952 | Glitsch | 137/505.17 X |
| 3,660,284 | 5/1972 | Camp | 210/49 |
| 3,779,910 | 12/1973 | Chatfield | 210/49 |
| 3,809,245 | 5/1974 | Kennedy | 210/207 |
| 4,060,481 | 11/1977 | Stoev et al. | 209/170 |

*Primary Examiner*—William A. Cuchlinski, Jr.

*Attorney, Agent, or Firm*—Seed, Berry, Vernon & Baynham

[57] ABSTRACT

A hydraulic flocculation system having a first stage tank receiving a liquid through an elbow conduit having an upwardly directed outlet. Liquid from the first stage tank flows into a pair of second stage tanks through respective elbow conduits also having upwardly directed outlets. Liquid is discharged from each of the second stage tanks into a third stage tank through respective elbow conduits having an upwardly directed outlet. Each outlet of the conduits is covered by a plate which slidably receives a plurality of upstanding rods secured to the conduits so that the plate can move toward and away from the outlet as the flow through the conduit varies. The plate acts as a constant pressure-loss valve to produce a head loss which is proportional to the weight of the plate in order to maintain the G-factor of the system relatively constant as the flow rate of liquid through each of the conduits varies. The G-factor of each stage of the system can thus be adjusted as desired by varying the weight of each plate. Other constant pressure-loss valves may be employed in other embodiments including a plate pivotally connected along one edge of the conduit and resiliently biased against the outlet of the conduit.

16 Claims, 3 Drawing Figures

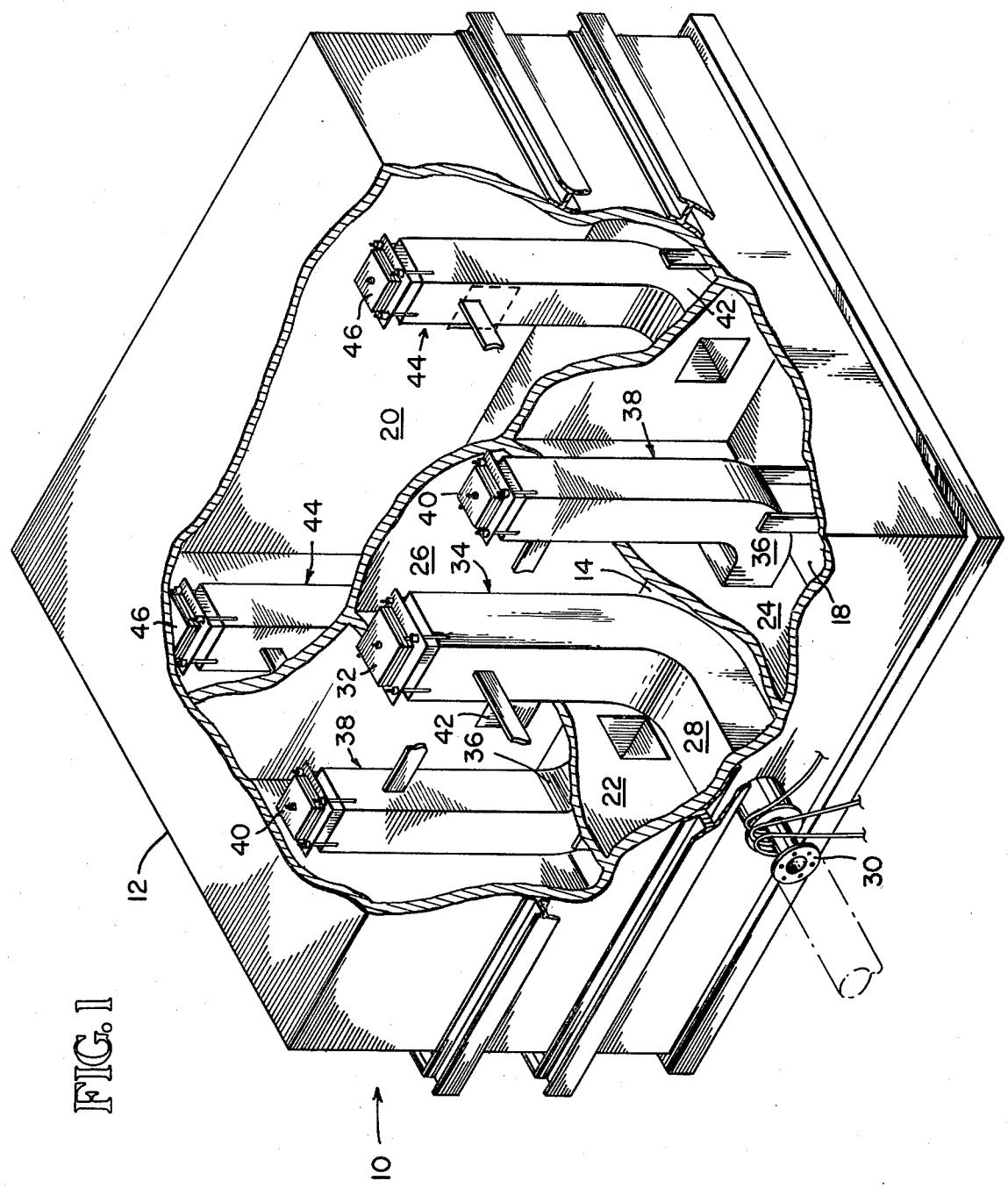

G-FACTOR COMPENSATED HYDRAULIC FLOCCULATION SYSTEM

BACKGROUND OF THE INVENTION

1. Field of the Invention

This invention relates to water treatment systems, and more particularly, to a hydraulic floculation system.

2. Description of the Prior Art

Although in the field of water treatment filtration is commonly thought of as effective in removing fine particles from liquids, such is usually not the case. In practice, effective filtration requires that the liquid be pretreated to cause the particles to group together in "flocs". Also particles settle out in settling basins more rapidly in the form of flocs than small, individual particles. This floc producing process is performed in two steps, namely "coagulation" and "flocculation".

The process of "coagulation" refers to the driving together of colloidal particles by chemical forces. The process occurs within seconds of the application of the coagulation reagents to the liquid, normally water. Because of this property, good mixing is necessary at the point of chemical application in order to insure uniform chemical distribution and exposure of the fine particles in the water to the coagulating agent before the coagulation reaction is completed.

The term "flocculation" refers to the assembling of coagulated particles into floc particles. Flocculation may be partly a chemical bridging mechanism, enhanced by the use of substances like polyelectrolytes, but it is much slower, and more dependent on time and amount of agitation, than coagulation.

There are basically two varieties of flocculation, namely, mechanical flocculation and hydraulic flocculation. Mechanical flocculators generally consist of two types, rotary units and reciprocating units that are usually operated through a crank mechanism. The usual mechanical flocculator drive is an electric motor operating through a gear-type speed reducer. Because the flow rate of water through the mechanical flocculation system may vary, variable speed drive equipment is desirable.

In hydraulic flocculation, power is dissipated in the water by friction generally by flowing the water through baffled tanks. The baffles may be horizontally causing the water to flow horizontally from end to end or vertical causing the water to flow under and over the baffles. Hydraulic flocculation systems have many advantages over mechanical flocculation systems. In addition to operating more uniformly, hydraulic flocculation systems can generally be produced at a lower cost, and they are essentially maintenance free since they do not require any moving parts.

Since flocculation is a mixing process, it is important to restrict particles from flowing from the inlet of a flocculation system directly to the outlet without interacting with other particles. The mixing figure of merit for a flocculation system is the "velocity gradient" or "G-factor". G-factors may be calculated as follows: For hydraulic flocculation:

$$G = \sqrt{62.4 \, \Delta H / \mu T} \quad \text{(Formula 1)}$$

and for mechanical flocculation:

$$G = \sqrt{550 P / \mu V} \quad \text{(Formula 2)}$$

in which the G-factor is given in fps per foot, $\Delta H$ is the head loss due to friction, in feet, $\mu$ is viscosity (0.273 × 10$^4$ pounds-seconds/sf at 50° F. for water), T is the detention time, in seconds, V is volume of the basin, in cubic feet and P is the horsepower dissipated in the water.

An examination of the formula for calculating the G-factor for hydraulic flocculation indicates that the G-factor is constant as long as the head loss $\Delta H$ and detention time T are constant.

Flocculating systems often include several flocculating stages. Tapered flocculation is frequently used, with the first flocculated stage operating at a high G-factor, the next stage operating at a lower G-factor and the final stage operating at a still lower G-factor. This accomplishes a maximum input of power, yet reduces particle shearing in the later stages thus building up larger particles that will either settle rapidly in settling tanks or be more efficiently removed by filters.

Excessive G-factors tend to shear floc particles and prevent them from building up to a size that will settle rapidly in settling tanks or be efficiently removed by filters. Insufficient G-factors fail to provide sufficient agitation to enable flocculation to become complete, and may fail to obtain the desired compaction. One problem with mechanical flocculation systems particularly of the rotary variety is that some portions of the mechanical agitator move more rapidly than other portions so that G-factor is not uniform. The outer portion of the agitator will often produce excessive G-factors while the inner portions of the agitator operate at an insufficient G-factor. G-factor non-uniformities can be alleviated to a large extent by hydraulic flocculation. However, the G-factor of a hydraulic flocculation system depends on the rate of flow of water through the system. This does not present a problem where the flow rate of water through the system is constant such as in on-off systems utilizing a storage reservoir. However, hydraulic flocculation systems have been incapable of operating effectively where the flow rate of water substantially fluctuates.

Another disadvantage of hydraulic flocculation systems is the inability to readily vary the G-factor of the system responsive to such variables as changes in the properties of the water or the coagulating chemicals added upstream. With mechanical flocculating systems the G-factor can be varied simply by varying the speed of the drive mechanism. With hydraulic flocculation systems the G-factor is determined entirely by the flow rate thus making it impossible to readily vary the G-factor at which such systems operate.

One variety of hydraulic flocculation system which has been manufactured and sold for many years by Keystone Engineering and Products Company of Seattle, Washington, utilizes a plurality of tanks, each of which receive water either from an external source or another tank through an elbow conduit having an upwardly disposed outlet. The elbows may be mounted in the tank by removable couplings so that they may be quickly interchanged with different sized conduits in order to vary the G-factor of the system. However, even this design is incapable of compensating for variations in flow rate to maintain a constant G-factor.

SUMMARY OF THE INVENTION

It is an object of the invention to provide a method and apparatus for hydraulically flocculating a liquid while maintaining the G-factor of the system substantially constant responsive to flow rate variations.

It is another object of the invention to allow the G-factor of a hydraulic flocculation system to be readily varied without changing the basic structure or dimensions of the system.

It is still another object of the invention to allow the G-factor of a hydraulic flocculation system to be tapered to follow any desired profile without changing the basic structure or dimensions of the system.

These and other objects of the invention are accomplished by allowing treated liquid to flow into a tank through an orifice having an effective size which is automatically controlled in order to maintain the head loss across the orifice substantially constant as the rate of flow through the orifice varies. The effective size of the orifice is controlled by a constant pressure-loss valve positioned between the orifice and tank. In one embodiment, the constant pressure-loss valve is implemented by a plate covering the orifice which is resiliently biased against the orifice with a substantially constant force so that the plate moves toward and away from the orifice responsive to variations in flow rate. The force is substantially equal to the product of the desired head loss to achieve a predetermined G-factor, the density of the liquid and the area of the orifice. In one embodiment, the orifice is implemented by an elbow conduit having its outlet facing upwardly in the tank. The plate may be slidably supported above the outlet so that the plate is movable toward and away from the outlet responsive to flow variations. The G-factor may then be adjusted by adjusting the weight of the plate.

BRIEF DESCRIPTION OF THE DRAWINGS

FIG. 1 is an isometric view of the hydraulic flocculation system.

DETAILED DESCRIPTION OF THE PREFERRED EMBODIMENTS

Figure 3:
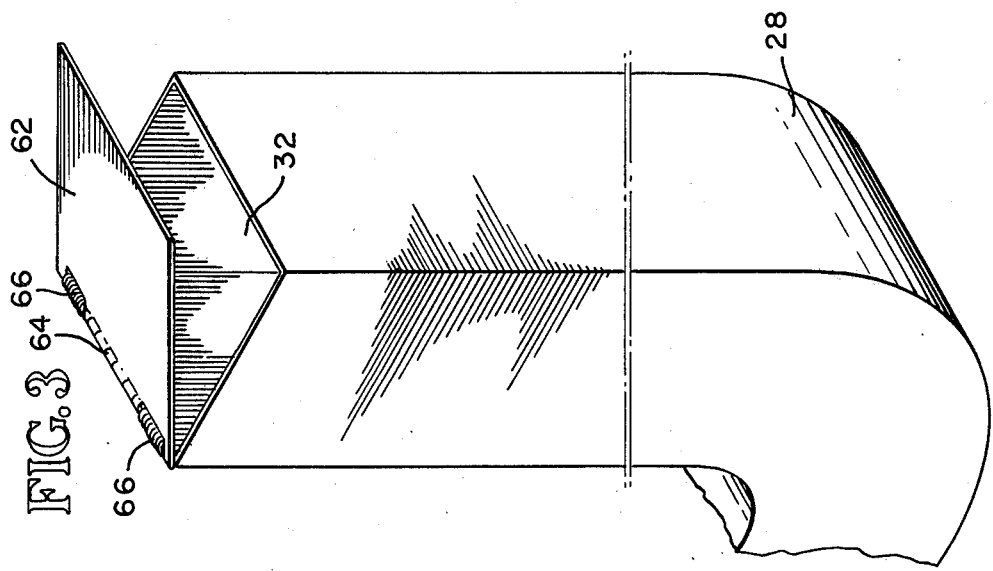
FIG. 3 is an isometric view of an alternative embodiment of a mechanism for maintaining the G-factor of the hydraulic flocculation substantially constant.

The hydraulic flocculation system 10 as illustrated in FIG. 10 includes a rectangular tank 12 divided into a first stage tank 14, a pair of second stage tanks 16, 18 and a third stage tank 20 by bulkheads 22, 24, 26. Liquid enters the first stage tank 14 through an elbow conduit 28 having its inlet terminating in a flange 30 external of the tank 12 and its outlet 32 directed upwardly in the tank 14. The conduit 28 includes a plurality of inlet ports 31 through which coagulating chemicals are injected into the incoming water. The outlet 32 is covered by a G-factor compensating mechanism 34 described in detail hereinafter.

Water is discharged from the first stage tank 14 into the second stage tanks 16, 18 through respective elbow conduits 36 also having G-factor compensating mechanisms 38 installed on their outlets 40. Finally, water from the second stage tanks 16, 18 is discharged into the third stage tank 20 through respective elbow conduits 42 each of which have a G-factor compensating mechanism 44 installed on their outlets 46.

The head loss $\Delta H$ of water flowing through an orifice such as the conduits 28, 36, 42 is given by the formula:

$$\Delta H = v^2/(64.4)K^2 \quad \text{(Formula 3)}$$

where v is the velocity of the water through the orifice 64.4 is twice the acceleration of gravity and K is an orifice constant which may vary to some extent but is generally about 0.75. The velocity v of the water through the conduits 28, 40, 42 is directly proportional to the flow of water through the system 10 and inversely proportional to a cross-sectional area of the conduits 28, 36, 42. Thus the head loss $\Delta H$ can be adjusted by adjusting the cross-sectional areas of the conduits. As indicated by formula 1, above, the G-factor is proportional to the square root of the head loss $\Delta H$.

Combining formula 1 with formula 3 yields:

$$\text{G-factor} = v/K \sqrt{0.969/\mu T}$$

which is approximately equal to:

$$\text{G-factor} = V/K\sqrt{\mu T} \quad \text{(Formula 4)}$$

In both mechanical and hydraulic flocculation systems, it is generally desirable to taper the G-factors from higher values to lower values as water flows through the system. Thus in the embodiment of FIG. 10 the cross-sectional area of the conduits 36 is approximately equal to the cross-sectional area of the conduit 28. Since the velocity of water through the conduit 28 is twice that of the conduits 36, the G-factor of the second stage is half the G-factor of the first stage. The flow rate of water through the conduits 42 is equal to the flow rate of water through the conduit 36. Thus in order for the head loss through the conduits 36 to be greater than the head loss through conduits 42 it is necessary for the cross-sectional area of conduits 42 to be greater than the cross-sectional area of conduits 36.

In one operational embodiment the G-factor for the first stage is calculated to be 76 as follows:

$$\text{G-factor} = V/K\sqrt{\mu T}$$

The velocity v is calculated to be the ratio of the flow rate F of the system to the cross-sectional area A of the conduit 28; where F equals 500 gallons per minute, A equals 64 square inches, K equals 0.75, $\mu$ equals $0.316 \times 10^{-4}$ pounds-seconds/sf. for water at 5° C., and T equals 60 seconds. The 60 seconds selected for T has been found to be correct in previous experiences with hydraulic flocculation systems of the character described. However, the value of T can be set if desired by designing surrounding tanks to a specific, precalculated volume.

The second stage of one operational embodiment also utilizes conduits 36 having a cross-sectional area of 64 sq. inches thereby yielding a G-factor of approximately 38. Finally, the conduits 42 having a cross-sectional area of 100 sq. inches yield a G-factor of approximately 24.3.

Since the head loss through each conduit 28, 36, 42, and hence the G-factor, is a function of the velocity of water through the conduits, it is apparent that as the flow of water into the conduit 28 varies, the G-factors for each stage will also vary. Small variations do not present a problem since the operating G-factor is not critical within limited ranges. However, substantial flow increase can shear floc particles and prevent them from building up to a size that will settle rapidly in settling tanks or be efficiently filtered. Substantial decreases in flow rates may fail to provide sufficient agitation to enable flocculation to become complete, and may fail to attain the desired compaction. Thus the G-factor cannot remain constant responsive to flow rate variations unless a constant head loss can be maintained through the conduits 28, 36, 42.

Figure 2:
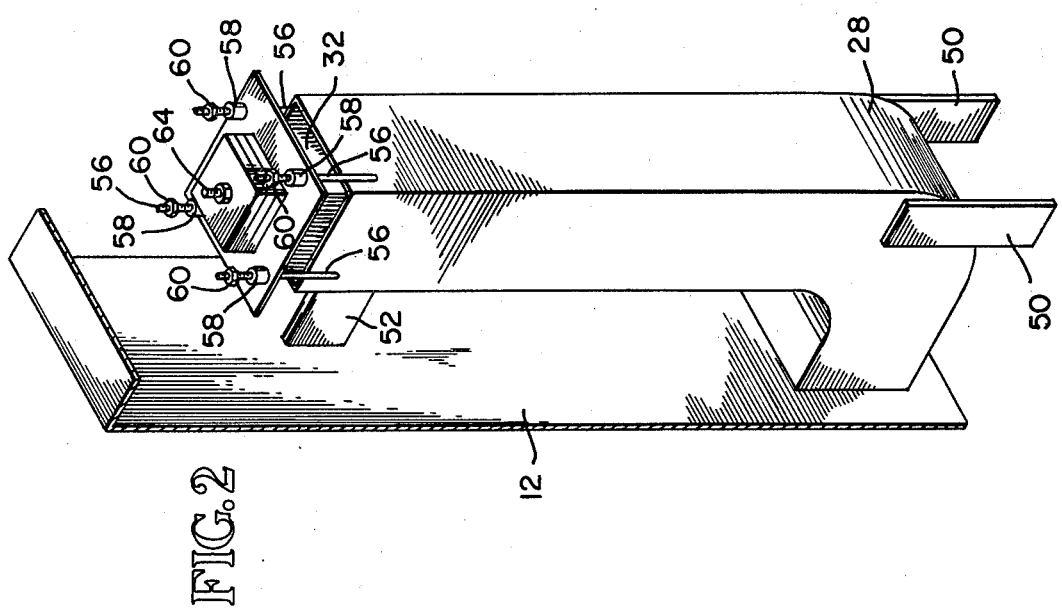
FIG. 2 is an isometric view of the mechanism for maintaining the G-factor of the hydraulic flocculation substantially constant.

The head losses through the conduits 28, 36, 42 can be maintained at a constant value by placing a constant pressure-loss valve at the outlets 32, 40, 46. As illustrated in FIG. 2, the conduit 28 is supported from the floor of the tank 12 by supports 50 and from the side of the tank 12 by a brace 52. The G-compensating mechanism 34 which acts as a constant pressure loss valve has been installed on the outlet 32 of the conduit 28. The mechanism 34 includes a plate 54 slidably mounted on upstanding rods 56 so that the plate 54 can move toward and away from the outlet 32 as the flow rate of water through the conduit 28 varies. The rods 56 extend through cylindrical guide rod bushings 58 which are fixedly secured to the plate 54. Stop members 60 are releasably secured to the rods 56 in order to limit upward movement of the plate 54.

As explained hereinafter, the headloss of water passing through the conduit 28 and compensating mechanism 34 is a function of the downward force exerted by the plate 54. In order to control and adjust the downward force exhibited by the plate 54 a number of weights 62 are placed on the upper surface of the plate 54 and secured in place by a rod 64 extending therethrough and fastened by stop member 64. The head loss $\Delta H$ of water flowing past the G-factor compensating mechanism 34 is given by the formula:

$$\Delta H = W/AD \quad \text{(Formula 5)}$$

where W is the submerged weight of the plate, A is the area of the plate, and D is the density of water.

Substituting formula 5 into formula 1 yields:

$$G = \sqrt{W/A\mu T} \quad \text{(Formula 6)}$$

It is important to note that none of the variables in formula 6 are determined by the flow rate of water through the system 10 so that the G-factor at which the system operates is entirely independent of flow rate. Instead, to a first order approximation, the G-factor is determined solely by the submerged weight of the plate 54 and submerged weights 62 W, the area of the plate 54 A, the viscosity of water $\mu$ and the retention time of the water T. The last two variables are in reality constants so that the G-factor selected is determined by the submerged weight of the plate 54 W and its area A. It is important to note that formula 5 does involve some approximations so that it may not be entirely accurate under all conditions. However, it is not critical that the actual G-factor at which the system operates is precisely as calculated by the above formula since the G-factor can be easily adjusted simply by varying the number of weights 62 on the plate 54 to achieve the desired head loss. The actual head loss may be easily verified simply by comparing the water levels of water entering and leaving the tanks 14–20. In one operational 500 gallon per minute system a first stage G-factor of 80 can be implemented by utilizing a 5.4 pound plate 54 having a 64 square inch area producing a headloss of 0.1945 feet. The velocity v of the water through the aperture is given by the formula 3 K as 2.654 feet per second. The aperture area A, then, at 500 gallons per minute (corresponding to 1.1141 cfs) is calculated to be 0.4197 feet square according to the formula A =flow rate/v.

For a conduit having an 8 inch side, and hence a 32 inch perimeter, the gap between the outlet 32 and the plate 54 is calculated to be about 1.9 inches. At 250 gallons per minute, the gap would be correspondingly reduced to 0.95 inches in order to generate the same 0.1945 foot head loss and G-factor of 80.

Although the constant pressure-loss valve is implemented in its simplest form as illustrated in FIG. 2, other embodiments are pratical. For example, as illustrated in FIG. 3, a plate 62 is pivotally secured along one edge of the conduit 28 above the outlet 32 by a conventional hinge 64. The plate 62 is biased toward the outlet 32 by a conventional torsion spring 66 so that the plate 62 is biased toward the outlet 32 at a constant force. As the flow rate of water through the conduit 28 varies, the plate 62 moves toward and away from the outlet 32 to maintain the head loss, and hence G-factor, substantially constant.

The inventive G-factor compensating mechanism thus, for the first time, allows a hydraulic flocculating system to operate at a nearly constant G-factor regardless of flow rate variations, and it allows the operating G-factor to be easily adjusted.

I claim:

1. A method of compensating for variations in flow rate of a treated liquid through a hydraulic flocculation system having an orifice through which said liquid flows, comprising automatically adjusting the effective size of said orifice in accordance with said flow rate in order to maintain the head loss across said orifice and the G-factor of said flocculation system substantially constant as said flow rate varies.

2. The method of claim 1 wherein the effective size of said orifice is controlled by a constant pressure-loss valve means so that a preset head loss is produced across said orifice.

3. The method of claim 1 wherein said orifice is formed by a conduit having its outlet covered by a plate, and wherein said plate is biased toward said orifice with a substantially constant force.

4. The method of claim 3 wherein said force is substantially equal to the product of the desired head loss to achieve a predetermined G-factor, the density of said liquid and the area of said orifice.

5. The method of claim 3 wherein the outlet of said conduit faces upwardly and said plate is slidably supported above said outlet so that said plate is movable toward and away from said outlet to adjust the effective size of said orifice in order to maintain the G-factor substantially constant as said flow rate varies.

6. The method of claim 5 further including the step of adjusting the G-factor of said flocculation system by adjusting the effective weight of said plate.

7. The method of claim 3 further including the step of adjusting the G-factor of said flocculation system by adjusting the force biasing said plate toward said outlet.

8. A hydraulic flocculation system, comprising:
a detention tank having a discharge port;
an orifice opening into said tank;
constant pressure-loss valve means position adjacent said orifice receiving a liquid containing a flocculation chemical for maintaining a constant head loss across said orifice thereby maintaining the G-factor of said system substantially constant with variations in flow rate of said liquid through said system.

9. The system of claim 8 wherein said constant pressure-loss valve means comprises a plate covering said orifice, and wherein said plate is biased toward said orifice with a substantially constant force.

10. The system of claim 9 wherein said force is substantially equal to the product of the desired head loss to achieve a predetermined G-factor, the density of said liquid and the area of said orifice.

11. The system of claim 9 wherein said orifice is formed at the outlet of an upwardly facing conduit and said plate is slidably supported above said outlet so that said plate is movable toward and away from said outlet to adjust the effective size of said orifice in order to maintain the G-factor substantially constant as said flow rate varies.

12. The system of claim 11 further including a plurality of removable weights releasably secured to said plate for adjusting the effective weight of said plate and thus the G-factor of said system.

13. The system of claim 8 further including means for adjusting the pressure-loss of said valve means thereby adjusting the G-factor of said system.

14. A three-stage hydraulic flocculation system, comprising:
a first stage tank;
a first conduit receiving a liquid containing a flocculation chemical, said conduit having its outlet facing upwardly in said first tank thereby discharging said liquid into said first tank;
a pair of second stage tanks;
a pair of second conduits having their outlets facing upwardly in respective second tanks, said conduits receiving said liquids from said first tank and discharging said liquids in respective second tanks, the combined cross-sectional areas of said second conduits being greater than the cross-sectional area of said first conduit thereby reducing the likelihood of floc disintegration;
a third stage tank;
a pair of third conduits having their outlets facing upwardly in said third stage tank, said conduits receiving said liquid from respective second stage tanks and discharging said liquid into said third tank, the combined cross-sectional area of said third conduits being greater than the combined cross-sectional area of said second conduits thereby reducing the likelihood of floc disintegration; and
respective constant pressure-loss valve means controlling the flow through each of said conduits for maintaining the head loss through each conduit substantially constant as the flow rate of said liquid through said system varies and to allow the G-factor for the stages to be tapered.

15. The system of claim 14 wherein each of said conduits faces upwardly and said constant pressure-loss valve means includes a plate slidably supported above each outlet of said plates so that said plates are movable toward and away from said outlets to adjust the effective size of said outlets as said flow rate varies in order to maintain the G-factor of said system substantially constant.

16. The system of claim 15 further including a plurality of removable weights releasably secured to said plate for adjusting the effective weight of said plate thereby adjusting the G-factor of said flocculation system.

* * * * *